US010810555B2

(12) United States Patent
Sigmund

(10) Patent No.: US 10,810,555 B2
(45) Date of Patent: Oct. 20, 2020

(54) METHOD AND SYSTEM FOR AUTHORIZING AND PROCESSING PAYMENT TRANSACTIONS OVER A NETWORK

(71) Applicant: MASTERCARD INTERNATIONAL INCORPORATED, Purchase, NY (US)

(72) Inventor: Matthias Wolfgang Sigmund, Köln (DE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 620 days.

(21) Appl. No.: 15/631,023

(22) Filed: Jun. 23, 2017

(65) Prior Publication Data

US 2017/0372275 A1  Dec. 28, 2017

(30) Foreign Application Priority Data

Jun. 23, 2016  (EP) .................................... 16175970

(51) Int. Cl.
*G06Q 20/04* (2012.01)
*G06Q 20/40* (2012.01)
(Continued)

(52) U.S. Cl.
CPC ............. *G06Q 20/04* (2013.01); *G06Q 20/02* (2013.01); *G06Q 20/06* (2013.01); *G06Q 20/12* (2013.01);
(Continued)

(58) Field of Classification Search
None
See application file for complete search history.

(56) References Cited

U.S. PATENT DOCUMENTS 7,431,207 B1  10/2008 Neemann et al.
2005/0065881 A1*  3/2005 Li ........................... G06Q 20/12
                                                                705/40
(Continued)

FOREIGN PATENT DOCUMENTS

CA         2601785 A1    10/2006
WO   WO-2006113834 A2 * 10/2006 ............. G06Q 20/32

OTHER PUBLICATIONS

International Search Report and Written Opinion for corresponding PCT Application No. PCT/US2017/036237 dated Jul. 24, 2017.

*Primary Examiner* — Jay Huang
*Assistant Examiner* — Gabriel Mercado
(74) *Attorney, Agent, or Firm* — Budzyn IP Law, LLC

(57) ABSTRACT

A method for authorizing and processing payment transactions over a network, the method comprising the steps of initiating, responsive to a user payment request to process a payment for a purchase on a merchants web site, a user interface, establishing a secure communication channel between the interface and an account server, the account server having stored a profile of an registered user, submitting, by the user interface, purchase information of the purchase order to the account server, requesting, by the account server through the user interface, authentication of the user, linking, at the account server, purchase information to the user profile, requesting, through the user interface, purchase confirmation by the user, requesting, by the user interface, a checkout reference for the confirmed purchase order from the account server, submitting, at least part of the purchase information and the checkout reference to a payment service provider to process the transaction.

19 Claims, 4 Drawing Sheets

(51) Int. Cl.
*G06Q 20/12* (2012.01)
*G06Q 20/22* (2012.01)
*G06Q 20/38* (2012.01)
*G06Q 20/02* (2012.01)
*G06Q 20/06* (2012.01)

(52) U.S. Cl.
CPC ........... *G06Q 20/22* (2013.01); *G06Q 20/382* (2013.01); *G06Q 20/403* (2013.01); *G06Q 20/4014* (2013.01)

(56) References Cited

U.S. PATENT DOCUMENTS

| | | |
|---|---|---|
| 2012/0030066 A1 | 2/2012 | Stringfellow et al. |
| 2014/0351126 A1 | 11/2014 | Priebatsch |
| 2015/0032626 A1* | 1/2015 | Dill .................... G06O 20/4016 705/44 |
| 2016/0019536 A1* | 1/2016 | Ortiz ................. G06Q 20/3227 705/67 |

* cited by examiner

METHOD AND SYSTEM FOR AUTHORIZING AND PROCESSING PAYMENT TRANSACTIONS OVER A NETWORK

FIELD OF THE INVENTION

The present disclosure relates to the field of online payment. More particularly, the present disclosure relates to a method and a system for authorizing and processing payment transactions over a network, wherein the payment transactions is for a purchase order placed by a user and to be paid from a user's financial account. Moreover the disclosure relates to a computer program product and a computer readable medium. The computer readable medium comprises computer-executable instructions, which, when executed by the respective devices being equipped with processors cause the devices to perform the method steps of the disclosure on the device interacting with the respective other device.

BACKGROUND

Electronic commerce (e-commerce), the trading of products or services over a network has become to a well accepted shopping mode used by an increasing number of users, and therefore now being well an established equivalent to conventional shopping in a physical shop. The user accesses via a terminal a merchant's offers presented in form of a online shop in the network, selects and subsequently purchases one or more products or services. Similar to conventional shopping, e-commerce also requires for completion of the contract of sale payment and exchange of information for delivery. Due to the fact that the entire purchase process is handled over a network, such as the internet, with no direct personal contact between the merchant and the customer, all required information and data, including sensible data, such as the data needed for authorization and processing of the payment or the address information needed for delivery of the purchased goods needs to be transmitted over the network.

Due to the nature of e-commerce, payment is normally processed on the basis of electronic funds transfer, for example making use of credit or debit cards. In order to minimize the risk of frauds, certain information related to the used card and/or account and needed for credit card payment processing has to be handled by certain, authorized service providers, so called payment service providers (PSP) only. Accordingly, the entities involved in e-commerce are a costumer or user, a merchant, a PSP and, depending on the payment method, a credit or debit card issuer. For conventional payment processing, as depicted in FIG. 1 the PSP serves as a link between the merchant and the card issuer, proving an interface which is implemented on the merchants web site and all information needed is routed through the PSP. Accordingly, the merchant communicates with the PSP and the PSP with the credit card issuer.

In order make a purchase in an online store of a merchant, the user has to connect to the merchant's online store e.g. by opening the respective web site with a browser. After selecting the product(s) to be purchased, normally by adding the product(s) to a virtual shopping cart, the purchase may be continued by initiating the payment process by selecting a payment method.

In a first step the relevant purchase information is handed over to the PSP, which, in the background, starts a—preferably secure—communication with the respective credit card issuer based on the selected payment method. Subsequently, a login of the user is requested via an interface implemented on the merchant's website or presented to the user in an additional, new browser window. After login is completed, the user might need to select the respective shopping cart or purchase order to be processed and shipping options, such as shipping address and shipping mode for further processing of the payment. Subsequently, the entire information related to the purchase, the so called check out data is routed through the PSP for presentation—at the PSP interface—to the user in order to get confirmation of the purchase from the user. After confirmation by the user, the total amount to be processed is transmitted to the PSP for processing of the payment to complete the purchase.

Due to the conventionally applied concept of routing all transaction related information through the PSP, the possibilities for interaction between the merchant and the card issuer, e.g. in the context of customer support or conflict resolution are very limited. In addition, as multiple different existing PSP are offering different interfaces and as a merchant may choose and contract a particular PSP, data handling and formatting might differ, such that, e.g. address information received from the card issuer might be displayed incorrectly. Furthermore, as the conventional approach requires respective databases on all of the involved instances, e.g. for every PSP, scalability of the system is rather limited.

Accordingly, in the light of the increasing use of e-commerce and the increasing number of online purchases, there is a need for an improved system in order in to enhance scalability, user friendliness while security standards are at least maintained or preferably improved.

SUMMARY OF THE INVENTION

The present disclosure provides one or more solutions to the problems and disadvantages of the background art. Other technical advantages of the present disclosure will be readily apparent to one skilled in the art from the following description and claims.

The present disclosure is directed to computer implemented method for authorizing and processing payment transactions over a network, the payment transactions being for a purchase order to be paid from a user's financial account, the method comprising:

Initiating, responsive to a user payment request to process a payment transaction for a purchase on a merchants web site, a user interface;

Establishing, by the user interface responsive to the user payment request, a secure communication channel with an account server, the account server having stored a profile of a registered user of an financial account;

Submitting, by the user interface, purchase information of the purchase order to the account server;

Requesting, by the account server through the user interface, authentication of the user;

Linking, at the account server, purchase information to the user profile;

Requesting, through the user interface, purchase confirmation by the user

Requesting, by the user interface responsive to the purchase confirmation, a checkout reference for the confirmed purchase order from the account server;

Submitting, by the user interface, at least part of the purchase information and the checkout reference to a payment service provider to process the payment transaction.

The present disclosure includes multiple aspects for authorisation and processing of payment transactions to made from a financial account of a user over a network, especially payments transactions initiated for online purchases made while online shopping on a merchants e-commerce application such as an web shop. The financial account may be linked to a credit card or a debit card issued by a card issuer. The user being the holder of the credit card or debit card may need to register to the respective services by the card issuer in order to make use of the respective payment process. As described in more detail below, methods according to embodiments of the present invention may be used during online shopping procedures, where a user of the system, i.e. a customer, accesses a virtual shop of a merchant, e.g. a online web shop presented over the internet and accessible via a standard web browser or a via a dedicated application running on a mobile device such as a smart phone or a tablet computer. The user accesses the virtual shop of the merchant. The virtual shop may be any suitable database solution accessible over a network, such that the user access the respective database making use of a terminal, such as an computer, smartphone or any other device capable of connecting to the network and to display the respective user interface representing the online shop to the user.

Upon selection of a product, e.g. a good or even a service, to be purchased, the respective product is added to a virtual shopping cart listing the products selected for purchase and for further processing of the online shopping. For that purpose, the user requests to finalize the purchase by requesting to process the payment transaction for the selected goods on the merchant's web store. The request for processing the payment transaction may be in form of clicking a "buy now" button or any equivalent user action suitable to trigger a process on the web site or within the dedicated application running on a mobile device. Responsive to this user action, a user interface is initiated.

The user interface may be in form of a plugin, a inFrame solution, a SDK or the like implemented in the merchant's web site or in the dedicated application for a mobile device. The user interface may be implemented to be presented in the same window or frame of the website or the application or may be opened as a new window or frame. The user interface provides a communication interface for the customer at the online shop with the account server held by the card issuer for initiating, processing and authorizing a purchase, and also communicates with the PSP in order to request processing of the payment and with the online shop in order to inform about the status of the payment for the conclusion of the purchase after the payment has been made.

The account server of the card issuer may provide multiple separate services which may be performed on a single server or split onto multiple servers. These services may include at least one token service for secure communication purposes, at least one database for storing user information such as a user profile of user registered to the services and, optionally, purchase information, a checkout service for processing the payment process in conjunction with the PSP and a communication interface for payment processing by the PSP. Once the user interface is initiated, a preferably secure communication channel between the user interface and the account server is established, which may make use of a token, i.e. the secure communication is based on security tokens issued by the account server upon request from the user interface.

The purchase information relating to the purchase order is transmitted to the account server and stored in a respective database. Responsive to the establishment of the communication, the account server requests via the user interface authentication of the user. For this purpose, a login screen or window may be presented to the user via the user interface on the web site or the dedicated application running on a mobile device.

After the user has entered the requested login information, the login information is compared with the data of the registered users stored at the account server. After approval of the login the user is authenticated and the respective user profile is linked with the purchase information of the respective purchase order made by the user. The user profile contains the information of the financial account held by the user, e.g. in form of a credit card or debit card of the card issuer and registered to the user. Subsequently, the purchase details, which may include the purchase information, payment information, and shipping information are presented via the user interface to the user for confirmation. The purchase information may include shopping cart information representing the purchase order, optionally including the line items of the chopping cart, and a merchant identity. The merchant identity may be the URL of a merchant's web shop or any other information suitable to identify the merchant. The purchase information may further include information regarding the merchant's account involved in the transaction.

In a further aspect of the present disclosure the user interface requests a checkout token from the account server prior to submitting the purchase information.

According to yet another aspect of the present disclosure the user interface requests an access token from the account server prior to requesting the confirmation from the user.

In yet another aspect of the disclosure, the user interface receives user address information from the account server. The user address information may be stored with the user profile at the account server, such that the user profile contains the information of the financial account held by the user, e.g. in form of a credit card or debit card of the card issuer and registered to the user and further information such as preferred shipping address or preferred shipping mode or other information which might be helpful for processing the purchase. The user address information may be presented via the user interface to the user for selection and/or confirmation. Optionally, the user may be given the opportunity to update or amend the information of the user, which is then transmitted to the account server for updating the stored user profile. The user interface then may submit the selected or confirmed user address information to the merchant for shipping of the purchase.

After the purchase (and the payment) has been confirmed by the user, the user interface requests checkout data related to the user and the purchase from the account server and submits the request for processing of the payment transaction, including the total amount to be paid, together with the checkout data to the PSP. Responsive thereto, the PSP requests payment details necessary for processing the payment transaction, which may include primary account number (PAN), expiry date and full 3DS data. The request contains at least the checkout reference and the at least part of the purchase information. The request for the payment details may include the total amount of the purchase, the checkout data, personal information of the user and/or combinations thereof.

In yet another aspect of the invention, the method further comprises, receiving, at the user interface, payment status information from the payment service provider and displaying the status information to the user, e.g. through the user interface. Accordingly, after reception of the payment details, the PSP processes the financial transaction, i.e. the payment and transmits payment status information to the user interface, which will be presented to the user and will update the merchants database to indicate the payment has been completed and the merchant should continue with shipping of the purchased goods.

In another aspect, the present invention is directed to system for authorizing and processing payment transactions for a purchase order from a user's financial account over a network, the system comprising: at least one user interface and an account server, wherein the user interface being implemented on a merchants online shop and configured to securely communicate with the account server for transmitting a user request for a financial transaction from a financial account of the user to a financial account of a merchant, the user interface being configured to request user authentication and purchase confirmation from the user and to transmit a checkout reference issued by the account server after purchase confirmation to a payment service provider for processing the financial transaction; and the account server having stored a profile of the registered user of the financial account, the sever being configured to securely communicate with the user interface and to store purchase information received from the user interface, to create, responsive to the purchase confirmation, the checkout reference and further configured to provide payment details related to the purchase information and the checkout reference upon request from a purchase payment provider to the purchase payment provider.

The payment transaction may be made via a credit card or debit card issued by a card issuer and associated to a financial account of a user and registered for the respective payment services according the method as described. The system comprises a user interface implemented on a merchants online shop. The online shop is a virtual shop presenting data related to products to be sold in the online shop stored in a database over a user interface. The user interface may be implemented as a web based solution accessible over a network such as the internet by a standard web browser or as a dedicated application to be installed on a mobile device, such as an smart phone, which accesses the database via the network. The user interface is initiated responsive to a user request indicating that the user wants to purchase a selected product and therefore request processing of the payment transaction. The user interface is configured to establish a secure communication channel with an account server of the card issuer making use of a token requested by the user interface, wherein the request is processed by a request token service running on the account server. The different services running on the account server may be in form of application or in form of separate server entities forming the account server.

The user interface is also configured to transmit purchase information to the account server, which may then be handled and stored by a shopping cart service. The account server is configured to request user authentication; the user information, i.e. user name and password, is compared with user profiles of users registered to the payment service stored at the account server. If the user is authenticated the respective purchase is linked to the user profile stored at the account server for further processing. The user profile stored at the account server may also contain additional information, such as shipping details and shipping addresses. The account server is further configured to request purchase confirmation from the user after the purchase has been linked to the user profile.

Additional information may be pulled from the user profile stored at the account server and presented to the user via the user interface for selection and or confirmation. When the user is allowed to modify information stored in his user profile stored at the account server, the user interface will upload amended or additional information to the account server for updating the user profile. The respective communication related to the confirmation process may be secured by requesting an additional checkout access token from the account server, wherein the request is processed by an access token service running in the account server. After confirmation the account server generates a checkout reference, which is transmitted via the user interface together with purchase information containing at least the total amount of the purchase to the payment service provider (PSP). The PSP requests payment details, i.e. all information necessary for processing of the payment from the account server, wherein the request contains at least the checkout reference and, optionally, purchase information such as the total amount.

The account server is configured to compare the information contained in the request for the payment details with the respective data stored at the account server, and, if the information matches and validly identifies and payment transaction to be processed, transmits the requested payment details to the PSP. The user interface is further configured to receive payment status information from the PSP and the inform the user and the merchant about the status of the payment transaction accordingly.

In another aspect, the present invention is directed to a computer program computer program product comprising program instructions for carrying out each of the method steps of the disclosure, when said product is executed on a computer.

Furthermore, the present invention is directed to a computer readable medium storing program instructions, which, when executed by a processor of a computer cause the computer to perform each of the method steps of the invention.

One advantage that may be realized in the practice of some embodiments of the described methods is that main part of the payment is processed directly between the costumer on the merchant's web site and the card issuer resulting in direct costumer relations between the merchant and the card issuer. The latter provides for example more opportunities for customer service and conflict resolution. In addition, due to the more centralized data handling, compatibility issue, e.g. with respect to address data formatting can be circumvented.

A technical effect of performing the methods according to the embodiments of the disclosure is to facilitate online shopping, as user information stored by the card issuer can be used, to increase scalability and compatibility, as the PSP is processing the financial transaction of the payment only and initiation and authorisation of the payment is handled by the card issuer making use of the card issuer databases, and to increase security, as request for payment details is based on the purchase information and on the checkout data.

Other technical advantages of the present invention will be readily apparent to one skilled in the art from the following description of preferred embodiments. Various embodiments of the present application obtain only a subset of the advantages set forth. No single advantage is critical to the embodiments. Any claimed embodiment may be technically combined with any other claimed embodiments.

BRIEF DESCRIPTION OF THE DRAWINGS

The accompanying drawings illustrate exemplary embodiments of the disclosure and serve to explain, by way of example, the principles of the disclosure.

DETAILED DESCRIPTION

Figure 1:
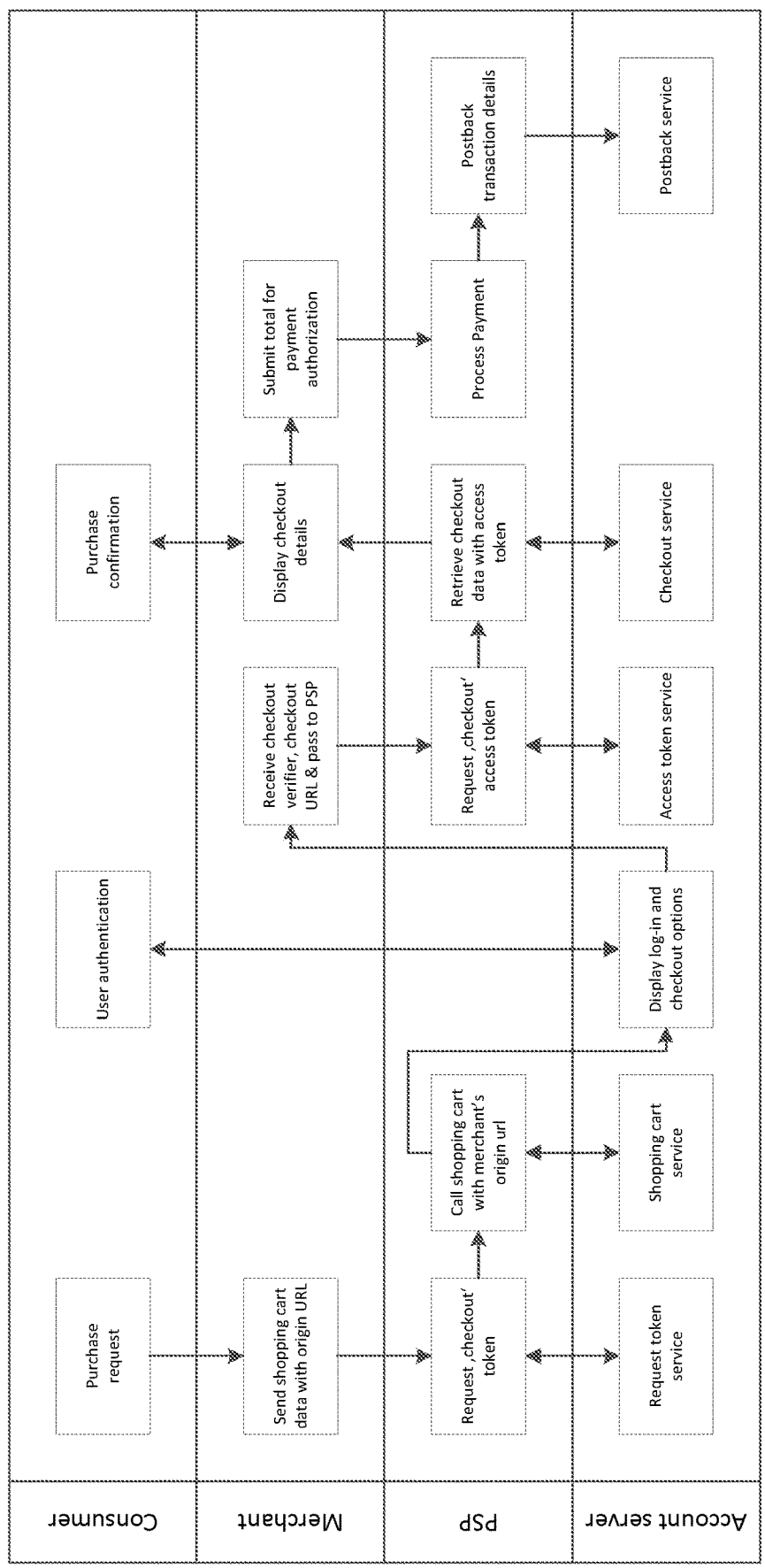
FIG. 1 shows a flow chart of the payment processing method including the involved entities according to the prior art.

The present disclosure will now be described more fully hereinafter with reference to the accompanying figures, in which preferred embodiments are shown. The method, however, may be embodied in many different forms and should not be construed to be limited to the embodiments set forth herein. It should be noted that these figures are intended to illustrate the general characteristics of the methods utilized in certain embodiments. However, the figures may not precisely reflect the precise structure or performance characteristic of any given embodiment. Moreover, in the figures like reference numerals designate corresponding parts throughout the different views or embodiments.

Referring now to FIG. 1 showing a shows a flow chart of the payment processing method including the involved entities according to the prior art. In the beginning after the user having accessed the online shop of a merchant and having selected at least one product for purchase, a corresponding purchase request is made. The PSP interacting with or being implemented in the merchants website, receives the data related to the purchase request, e.g. shopping cart data and origin URL, and establishes a secure, token based communication with the account server of the card issuer. At the level of the account server, a shopping card service is processing the request. Log-in and checkout options are presented to the user for authentication. After the user has successfully been authenticated to the system, the respective purchase request is linked to the user on the basis of the stored user profile and the purchase request is further processed and a checkout verifier is created, and securely communicated via the PSP to the account server making use of token based communication. The PSP receives from a checkout service on the account server checkout data which is displayed to the user for confirming the purchase. After confirmation of the purchase by the user, the purchase process is finalized by the PSP processing the payment in interaction with the account server of the card issuer.

Figure 2:
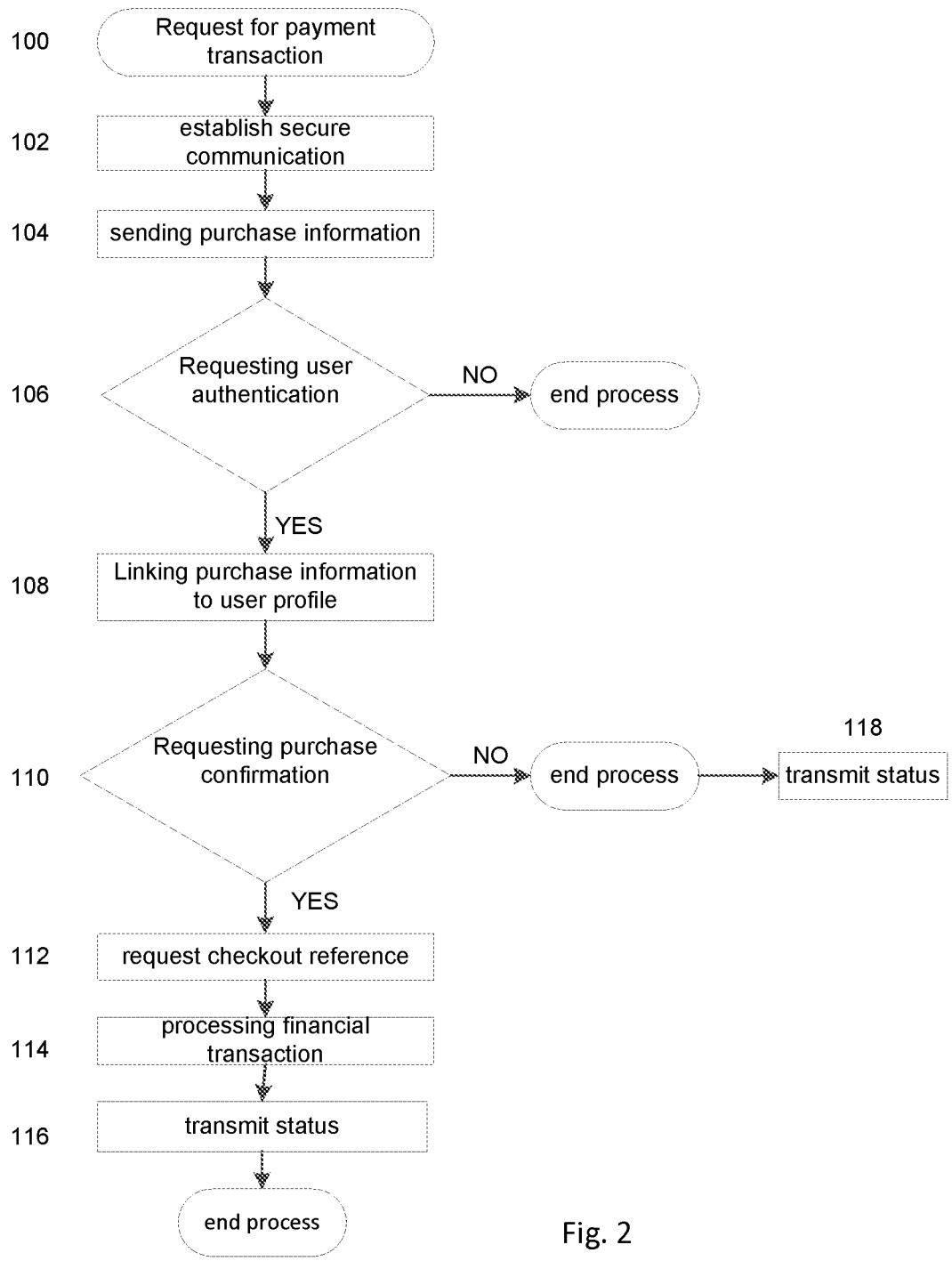
FIG. 2 shows a flow chart of the payment processing method according to an embodiment of the present invention.
Figure 3:
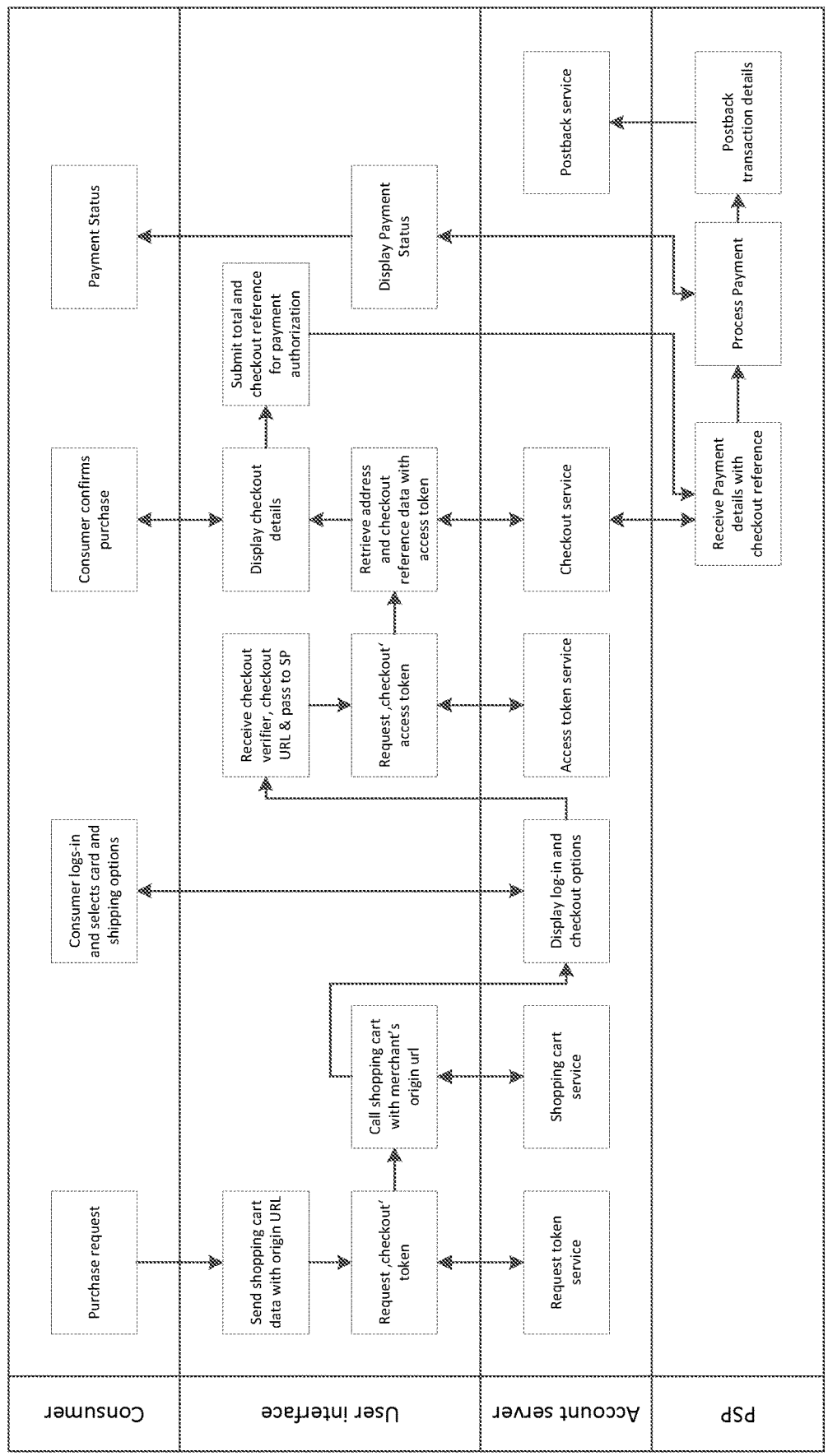
FIG. 3 shows a flow chart of the payment processing method including the involved entities according to an embodiment of the present invention.

Referring now to FIGS. 2 and 3 showing a flowchart of a method for authorizing and processing payment transactions over a network according to the invention. After the user of the system (i.e. a customer) has accessed an online shop of a merchant over a network with his terminal and has selected at least one product for purchase, the user starts, in step 100, the method according to the invention by requesting processing of the payment transaction for the purchase of the selected good(s) making use of a certain payment method, wherein the request is directed to payment of the purchase with a credit or debit card issued to the user, linked to the financial account and registered for payment services. Responsive to this user request, a user interface is initiated. The user interface is a seamlessly implemented into the merchant's online shop and provides a communication interface interacting with the services and databases necessary for processing of the payment.

When the user interface is initiated, at step 102, a secure communication channel is established with the account server of the cards issuer. The account server provides distinct services, such as an request token service, a shopping card service, an access token service a checkout service and/or an postback service, which may be implemented on one or on multiple separate server entities, and maintains a database of users registered to the respective payment process according to the invention. The account server further contains an additional database for storing the shopping card data with the merchant information, which may be in form of a origin URL, which is also used during the subsequent process of payment processing.

For establishing secure communication the user interface request a token from the account server; the request is handled by the request token service running on the account server. In addition, at step 104, the purchase information relating to the purchase order initiated by the user is send via the user interface to the account server and stored at the account server by a shopping cart service. The purchase information contains the shopping cart data together with at least the origin URL indicating the merchant's identity.

Responsive to the reception of the purchase information, the account server requests, at step 106, via the user interface, authentication of the user having requested payment. The authentication request is linked to the respective purchase information, i.e. the merchant's identity and the purchase order in form of a shopping cart list or the like, and the respective database entry is updated accordingly. A login screen is presented to the user on his terminal via the user interface indicating to the user for which purchase the login into the payment system is for. For authentication any means for authentication know to the person skilled in the art may be applied, e.g. user identification by user name and password or biometric identification. With the authentication process, a user profile of a user registered to the payment method is identified and selected from the user profile database associated to the account server. If the user has not registered to the payment method, he is promoted to register in order to proceed with the purchase. If the identification failed, the user will be prompted again. If no user profile can be identified, either because of the user has not registered to the service, or because of authentication failure, the process will be stopped and the merchant will be informed accordingly. If authentication of the user was successful and a user profile was identified, the payment process is continued.

After successful authentication of the user, i.e. when the login credentials provided by the user match with an entry in the user database at the account server, at step 108, the database is updates accordingly and the purchase information is linked to the user profile. In case of failure of the user authentication, the user trying to login is informed accordingly.

Responsive to the authentication and the linking of the purchase information with the user profile, at step 110, confirmation for processing the payment for continuing the purchase is requested by the user. Additional information relating the purchase, e.g. shipping details, shipping directions, and the like, stored together with the user profile at the account server, may be pulled and presented to the user for selection or confirmation. Additionally, a possibility for adding or amending the additional data may be provided to the user. In this case, the amended or new information will be uploaded to the user profile. Prior to transmitting the confirmation request to the user, an access token is requested by the user interface from the account server; the request will be processed by an access token service running on the account server. Due to the access token, secure communication is enabled.

After positive confirmation, at step 112, a checkout reference related to the respective purchase done by the user is requested from the account server; the request may be processed by a dedicated checkout service running on the account server. The checkout reference is linked to the purchase information and the user profile and the respective database is updated accordingly. The checkout reference identifies the purchase, including the purchase amount and the target for the financial transaction, i.e. the merchant's financial account, and the user profile, including the user account and credit card/debit card information used for the payment. After reception of the checkout reference at the user interface, a request for processing of the payment is made, including at least the total amount of the purchase and the checkout reference is transmitted to the PSP for processing the payment. If the purchase in not confirmed by the user, the processing of the payment process ends and, at step 118, the status, i.e. that the payment process is not continued, is transmitted and displayed to the user.

The PSP, at step 114, subsequently requests the payment details necessary for processing of the payment from the account server, wherein the request includes at least the checkout reference, but may also include the additional information relating to the purchase, e.g. the total purchase amount or user information. Responsive thereto, when the information contained in the request matches with the respective entries at the account server, the payment details are transmitted to the PSP and the payment transaction can be processed.

The checkout reference is sufficient for the PSP to get the information required for processing the payment from the account server. However, if additional information is required for receiving the payment details, e.g. the combination of checkout reference and payment amount, the security level for polling the payment details from the account server is increased. In addition, as the PSP is involved only for the actual processing of the payment, user information is concentrated on the level of the account server and does not need to be processed by third party entities, as e.g. the PSP.

After processing of the payment transaction, the PSP, at step 116, transmits the status of the payment to the user interface for informing the user as well as the merchant, the latter can be done in the background by simply updating a respective database such that the merchant is informed to continue with delivery of the purchased products. In case that the payment transaction cannot be processed, the respective status is also transmitted to the user interface such that the user and the merchant know that the payment has not been made and the purchase has not been finalized.

Figure 4:
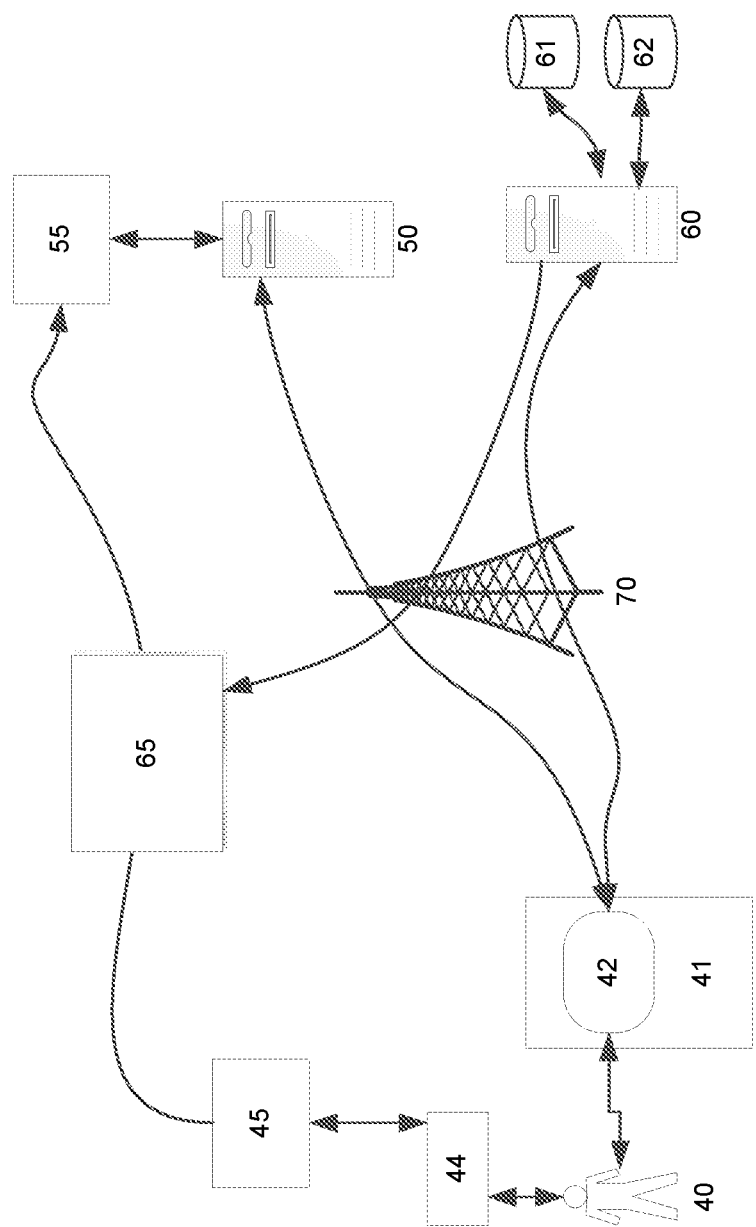
FIG. 4 shows a system for authorizing and processing payment transactions.

FIG. 4 is a block diagram showing the system for authorizing and processing payment transactions from a user's financial account 45 over a network 70 to a merchant's financial account 55. The user 40 having an financial account 45 associated to a credit card 44 accesses online shop of a merchant executed on a merchant server 50 via a user terminal 41. After the user 40 has selected good(s) and/or services offered by the merchant on the online shop for purchase, the user 40 initiates a user payment request to process the payment for purchasing the selected good(s) and/or services and as such for finalising the purchase. Responsive to the user payment request a user interface 42 is initiated. The user interface 42 is implemented on the merchant's online shop executed on the merchant server 50 and is presented to the user 40 on the user terminal 41. The user interface 42 is configured to communicate with an account server 60. The account server 60 is connected to a database 61 storing profiles of registered users of financial accounts associated with credit cards and registered for the online payment method. Responsive to the user payment request, the user interface 42 establishes a secure communication channel to communicate with the account server 60 and transmits purchase information related to the underlying purchase order to the account server 60. The account server 60 is connected to an additional database 62 for storing the purchase information received by the user interface 42. Responsive thereto, the account server 60 sends an authentication request to the user 40. The authentication request is transmitted to the user interface 42 and presented via the user interface 42 on the terminal 41 to the user.

By authentication of the user, the corresponding user profile is identified and selected in the database 61 associated to the account server 60 and the purchase information and/or the payment request is associated to the respective user profile and the purchase information entry in the additional database 62 is updated accordingly. Responsive thereto, the account server 60 sends a purchase confirmation request to the user interface 42, which is presented by the user interface 42 on the terminal 41 to the user 40. After confirmation of the purchase by the user 40, the user interface 42 sends a request for a checkout reference to the account server 60. After the checkout reference associated to the purchase is generated by the account server and the additional database 62 is updated accordingly, the checkout reference is transmitted to the user interface 42. After receiving the checkout reference the user interface 42 transmits at least part of the purchase information and the checkout reference to a payment service provider 65, which then processes the payment from the user's financial account 45 to the merchant's financial account 55. The services provided by the account server 60 may be implemented on one or on multiple different server entities, as described in the context of FIG. 3.

This description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art.

The invention claimed is:

1. Computer-implemented method for authorizing and processing payment transactions over a network, the payment transactions, for a user, being for a purchase order to be paid from a user's financial account associated with the user, the method comprising:
 a) initiating, responsive to a user payment request, by the user, to process a payment transaction for a purchase on a website of a merchant, a user interface;
 b) establishing, by the user interface responsive to the user payment request, a secure communication channel with an account server of a financial account issuer of the user's financial account, the account server having stored a user profile of the user;
 c) submitting, by the user interface, purchase information of the purchase to the account server;

d) requesting, by the account server through the user interface, authentication of the user;

e) linking, at the account server, the purchase information to the user profile;

f) requesting, through the user interface, confirmation of the purchase by the user;

g) requesting, by the user interface responsive to the confirmation of the purchase, a checkout reference for the purchase from the account server;

h) submitting, by the user interface, at least part of the purchase information and the checkout reference to a payment service provider to process the payment transaction.

2. The method according to claim 1, wherein the secure communication is based on security tokens issued by the account server upon request from the user interface.

3. The method according to claim 1, further comprising providing, at the account server responsive to a request by the payment service provider, payment details to the payment service provider, the request containing at least the checkout reference and the at least part of the purchase information.

4. The method according to claim 1, further comprising, receiving, at the user interface, payment status information from the payment service provider and displaying the status information to the user through the user interface.

5. The method according to claim 1, wherein the user interface receives user address information from the account server.

6. The method according to claim 5, wherein the user interface submits the user address information to the merchant for shipping of the purchase.

7. The method according to claim 1, wherein the purchase information includes shopping cart information representing the purchase.

8. The method according to claim 7, wherein the shopping cart information includes the line items of the shopping cart.

9. The method according to claim 7, wherein the shopping cart information includes identity of the merchant.

10. The method according to claim 9, wherein the identity of the merchant is a URL associated with the merchant.

11. The method according to claim 1, wherein the purchase information further includes the final amount of the payment transaction.

12. The method according to claim 11, wherein the purchase information further includes, for the merchant, account details involved in the payment transaction.

13. The method according to claim 1, wherein the user interface is implemented in a web site associated with the merchant.

14. The method according to claim 13, wherein the user interface is implemented by one or more selected from the group consisting of a plugin, and a SDK.

15. The method according to claim 1, wherein the user interface requests a checkout token from the account server prior to submitting the purchase information.

16. The method according to claim 1, wherein the user interface requests an access token from the account server prior to requesting the confirmation of the purchase from the user.

17. A system for authorizing and processing payment transactions for a user, to be paid from a user's financial account associated with the user, over a network, the system comprising:

at least an user interface and an account server computer of a financial account issuer of the user's financial account, wherein the user interface being implemented on an online shop of a merchant and configured to securely communicate with the account server computer for transmitting a user request for a payment transaction from the user's financial account to a financial account of the merchant, the user interface being configured to request user authentication and purchase confirmation from the user and to transmit a checkout reference issued by the account server computer after purchase confirmation to a payment service provider for processing the payment transaction; and the account server computer having stored a profile of the user, the account server computer being configured to securely communicate with the user interface and to store purchase information received from the user interface, to create, responsive to the purchase confirmation, the checkout reference and further configured to provide payment details related to the purchase information and the checkout reference upon request from a purchase payment provider to the purchase payment provider.

18. A computer program product comprising computer executable instructions embodied in a non-transitory computer readable storage medium for performing the steps of claim 1.

19. A non-transitory computer readable storage medium storing program instructions, which, when executed by a processor of a computer cause the computer to perform the steps of claim 1.

* * * * *